July 21, 1964
W. F. OLASHAW
3,142,003
ELECTRICAL CONTROL PANEL STRUCTURE
Filed Sept. 13, 1961
2 Sheets-Sheet 1
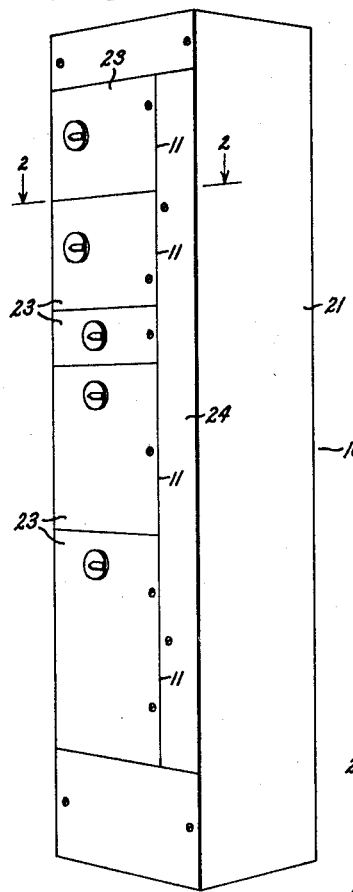
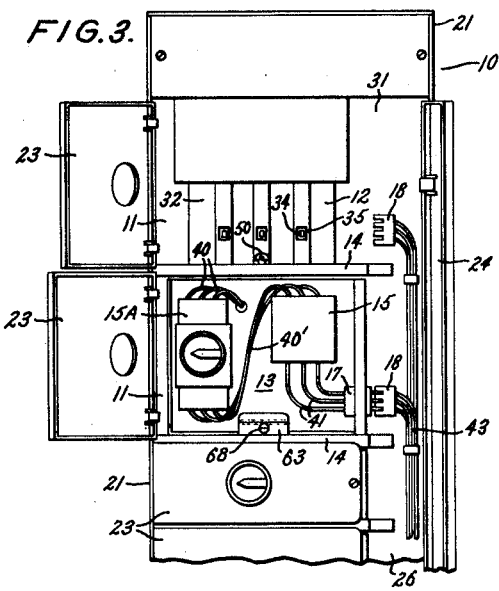
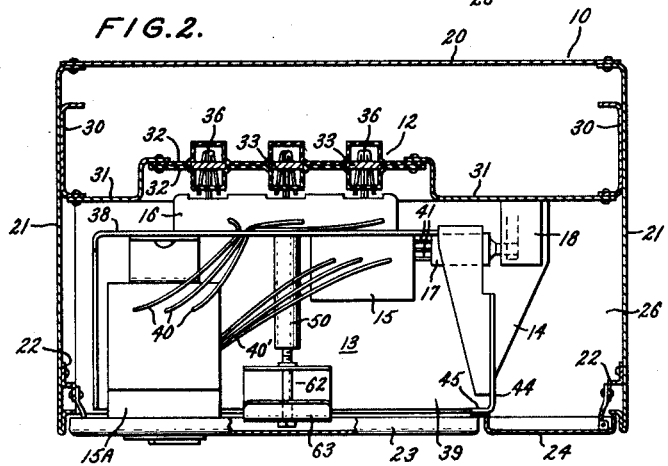
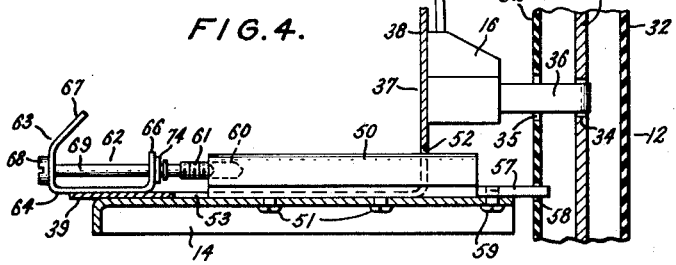
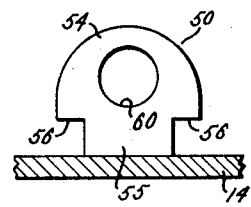
INVENTOR:
WILLIAM F. OLASHAW,
BY David M. Schiller
ATTORNEY.

July 21, 1964 W. F. OLASHAW 3,142,003
ELECTRICAL CONTROL PANEL STRUCTURE
Filed Sept. 13, 1961 2 Sheets-Sheet 2

INVENTOR:
WILLIAM F. OLASHAW,
BY David M. Schiller
ATTORNEY.

United States Patent Office 3,142,003
Patented July 21, 1964

3,142,003
ELECTRICAL CONTROL PANEL STRUCTURE
William F. Olashaw, New Britain, Conn., assignor to General Electric Company, a corporation of New York
Filed Sept. 13, 1961, Ser. No. 137,907
19 Claims. (Cl. 317—120)

This invention relates to electrical structures and more particularly to control centers including control units adapted for insertion and withdrawal into and out of a housing for electrical connection to and disconnection from bus bars contained in the housing.

Control centers of previous design have included housings containing bus bars and means for supporting control units which mount control devices and which are slidable into and out of the housing for electrical connection to and disconnection from the bus bars. In control centers of this type problems have existed in effecting proper alignment and guidance of the control unit relative to the bus bars so that contacts carried by the control unit and connected to the devices may be readily and positively moved into engagement with the bus bars during insertion of the control unit into the housing.

Difficulties have previously been encountered in obtaining firm engagement betwen contacts carried by the control unit and bus bars in the housing during insertion of the control unit. In many previous designs an operator has been required to expend considerable time and energy in manually inserting the control unit into the housing to an extent sufficient for obtaining the necessary firm engagement between the contacts and bus bars. Manual withdrawal of the control unit from the housing has heretofore necessitated substantial time and effort due to the large pulling force required to disengage the contacts from the bus bars. Also, the large pulling force required may result in sudden release of the control unit from the bus bars which can result in injury to the operator and damage to the control unit which is most likely to be thrown out of engagement with its supporting shelf.

In addition, manual insertion and withdrawal of the control unit has necessitated the operator grasping parts of the control unit located inside the housing such that the hands of the operator come into proximity with bare terminals and with the bus bars which in many cases are uninsulated. In many previous designs the control unit has been retained within the housing on its shelf merely by the frictional engagement between the contacts of the unit and the bus bars which may be insufficient to prevent relative movement between the control unit and the supporting shelf in certain installations.

It is therefore a primary object of the present invention to provide an electrical structure including a housing and an apparatus unit to be inserted and withdrawn into and out of the housing with novel and improved means for aligning and guiding the unit relative to conductors within the housing to allow rapid and positive connection of the unit to the conductors.

It is another object of the invention to provide an electrical structure including a housing and an apparatus unit to be inserted and withdrawn into and out of the housing with novel and improved actuatable means for effecting insertion and withdrawal of the unit into and out of engagement with conductors in the housing so as to minimize the possibility of injury to personnel and damage to the apparatus unit.

It is a further object of the invention to provide an electrical structure including a housing and an apparatus unit to be inserted and withdrawn into and out of the housing with improved means for rigidly retaining the control unit selectively in either an operative or nonoperative position within the housing.

It is still another object of the invention to provide an electrical structure including a housing and an apparatus unit to be inserted and withdrawn into and out of the housing with improved guide means for accurately guiding the unit into electrical connection with bus bars within the housing, and with improved locking means accessible to an operator at a safe position for rigidly retaining the unit within the housing and for permitting rapid and safe insertion and withdrawal of the unit into and out of connection with the bus bars.

It is a still further object of the invention to provide an electrical structure including a housing and an apparatus unit to be inserted and withdrawn into and out of the housing with novel and improved unit guiding and actuating means for rapidly and positively locating the unit mechanically and electrically with respect to parts in the housing to minimize operator time and effort while providing maximum safety to the operator.

In carrying out the invention in one preferred form there is provided a control center including a stationary housing or cabinet containing a vertical busway including parallel bus bars and insulation between the bars and a front opening of the housing. The housing mounts a horizontal shelf for supporting an apparatus or control unit to be inserted and withdrawn into and out of the housing and which contains line and load contact terminal blocks connected to devices on the unit and to be connected respectively to the bus bars and to a load contact terminal block in the housing when the control unit is inserted.

The mounting shelf detachably supports a guide bar which has a rear extension projecting into a slot formed in the bus bar insulation in vertical alignment with one of a plurality of plug-in slots formed in the insulation in horizontal alignment with plug-in openings of the bus bars. The control unit includes a supporting plate or saddle having an opening configured to receive the guide bar during insertion of the control unit, and the saddle rotatably mounts a screw adapted to threadably engage a threaded opening in the guide bar after partial insertion of the control unit. When the screw engages the threaded guide bar opening, rotation of the screw in an inserting direction effects positive and accurate movement of the control unit into the housing such that stab contacts on the unit readily enter into firm engagement with the bus bars. The control unit is withdrawn from the housing by rotation of the screw in the reverse direction which provides a strong uniform force of withdrawal.

The saddle and shelf include openings which are aligned when the control unit is so positioned on the shelf that the unit contacts are disengaged from the bus bars. These aligned openings are adapted to receive a suitable lock so that the unit can be locked to the shelf for repair or other purposes in an inoperative or "power off" position.

Other objects and advantages of the invention will become apparent from the following description taken in conjunction with the accompanying drawings in which:

FIGURE 1 is a view in perspective of a compartmented electrical structure showing portions of the housing thereof;

FIGURE 2 is a view with parts shown in section taken along the line 2—2 of FIGURE 1;

FIGURE 3 is a view in front elevation with parts broken away showing the interior of the housing and showing an apparatus unit mounted within the housing;

FIGURE 4 is a view in side elevation with parts in section and parts broken away showing the guide means, aligning means and actuatable unit moving and locking means;

FIGURE 5 is a view similar to FIGURE 4 showing a different arrangement of the unit moving and locking means;

FIGURE 6 is a view in perspective with parts broken away showing the interior of one compartment of the housing and showing a control unit positioned externally of the housing;

FIGURE 7 is a view in front elevation showing the configuration of the guide bar on the mounting shelf; and FIGURE 8 is an enlarged view in side elevation showing details of the unit moving and locking means on the unit saddle.

Referring now to the drawings the electrical structure is shown in the form of a control center and comprises in general a stationary housing or cabinet 10 having a number of vertically disposed compartments 11 and a vertical busway 12 extending substantially the full height of the housing 10 and passing through each of the compartments 11. A plurality of apparatus units or control units 13, only one of which is shown, are adapted to be inserted and withdrawn into and out of the compartments 11 for electrical plug-in connection to and disconnection from the busway 12, and the control units 13 when inserted are supported on vertically spaced horizontal shelves 14 within the housing which divide the housing into the several compartments. Each unit 13 includes one or more electrical control devices 15 and 15A and line and load contact terminal blocks 16 and 17 connected to the devices, and adapted to be electrically connected respectively to the bus bars and to a load contact block 18 mounted in the associated compartment and connected to a suitable load device, such as a motor. The terminal blocks 16 and 17 and their cooperation with certain other features of cabinet structure disclosed herein are more fully described and claimed in application S.N. 142,340 filed on October 2, 1961 by Robert W. Brokaw and assigned to the same assignee as the instant application.

More specifically, the housing 10 includes a rear panel 20 formed of a suitable sheet metal and extending the full height of the housing between top and bottom panels (not shown). The panel 20 is intermediate and is connected as by rivets or screws to a pair of spaced parallel side panels 21 which mount at their front edges brackets 22 to which are hinged doors 23 and 24 which are swingable about vertical axes to conceal and expose the interior of the housing. A plurality of individual unit doors 23 are provided each for association with a separate one of the compartments 11, whereas a single trough door 24 extends substantially the full height of the housing 10 and is provided for concealing and exposing a wiring trough 26 which extends uninterrupted substantially the full height of the housing to accommodate load conductors leading from the load contact blocks 18. In FIGURES 1 and 2 the doors 23 and 24 are shown in closed conditions wherein the doors are in a common plane at the front of the housing, and in FIGURE 3 two doors 23 and the door 24 are shown open to expose the interior of two compartments 11, and the trough 26 to permit access thereto through front openings of the housing.

In order to support the busway 12 a pair of channel-shaped members 30 are secured to the side panels 21 at areas adjacent the rear of the housing and extend substantially the full height of the housing. A pair of vertically extending generally Z-shaped mounting plates or brackets 31 are secured to the forwardly positioned flanges of the members 30 and mount therebetween at their rearwardly offset coplanar ends the insulation for the busway 12 which comprises a pair of identically configured insulating parts 32 each of which preferably is an integral unit extending substantially the full height of the housing. The insulating parts 32 are shown in FIG. 2 as having three vertically extending horizontally spaced recesses and are mounted in face-to-face opposing relation to provide three composite pockets in which are retained three bus bars 33 of a three phase system which extend vertically substantially the full height of the housing. The construction of the busway 12 forms no part of the present invention and is disclosed and claimed in Patent No. 3,096,131 assigned to the assignee of the present invention. As best shown in FIGS. 2, 3 and 4 the bars 33 include plug-in openings 34 horizontally aligned in each compartment and vertically aligned along the busway to receive stab contacts 36 carried by the block 16 and which project through plug-in openings 35 in the insulation member 32 located adjacent the block 16 and aligned with the openings 34. The busway 12 and the brackets 31 form a rear compartment wall or dividing wall extending substantially the height of the housing. Such wall and its cooperation with certain other features of housing structure form no part of the present invention and are disclosed and claimed in application S.N. 135,880, filed September 5, 1961, by Albert H. Adams and William F. Olashaw, and assigned to the same assignee as the instant application.

As best shown in FIGS. 4 and 6 the control unit 13 includes a mounting plate or saddle 37 of generally L-shaped configuration having a vertically extending rear wall 38 which supports at its rear surface the block 16, and a horizontally extending base 39 connected to the wall 38 and which is adapted for sliding engagement with the shelf 14 of a selected compartment when the control unit is inserted. The device 15, which may comprise a motor starter or other protective device, and the device 15A, which comprises a circuit breaker or manually actuable switch, are both mounted on the forward surface of the wall 38. The device 15A is connected to the stab contacts 36 by conductors 40 (FIGS. 2 and 6) and conductors 40' conect the device 15A to the device 15 which in turn is connected to the load terminal block 17 by conductors 41 (FIGS. 2 and 3). The block 17 is also mounted on the forward surface of the wall 38 and includes a plurality of laterally extending contacts 42 adapted to engage contacts (not shown) of the associated load block 18 conveniently supported on the right-hand bracket 31 as viewed in FIG. 2. A plurality of load terminal blocks 18 are mounted in the housing in vertical alignment each adjacent a separate compartment and the trough 26, conductors 43 (FIG. 3) extending from all the blocks 18 are contained within the trough 26 and lead to suitable load devices, such as motors. As shown in FIGS. 2 and 6 the saddle 37 includes a side wall 44 which, when the unit is inserted, forms a barrier between the associated compartment and the trough 26, and which has a vertically extendnig front portion 45 serving as a stop against which the associated door 23 and the door 24 are adapted to close.

The present invention contemplates the provision of improved aligning and guiding means for accurately aligning the control unit with respect to the bus bars and for guiding the control unit into the housing so as to assure rapid and positive engagement of the contacts 36 with the bus bars 33. For this purpose guide means are provided in the housing and on the control unit for interfitting engagement during insertion of the control unit into a selected compartment. A plurality of similar guide means in the housing are provided each for a separate compartment and one such guide means is illustrated in FIGS. 6 and 7 in the form of an elongated metallic or insulating guide bar 50 detachably secured to the upper surface of the associated shelf 14 as by screws 51 to extend from front to rear in the housing. The guide means on the control unit is best shown in FIG. 6 and constitutes a guide aperture or opening 52 in the lower portion of the rear wall 38 of the saddle having a curved wall and communicating with a guide slot 53 formed in the base 39 of the saddle and extending from the opening 52 toward the front of the saddle.

The configuration of the guide bar 50 is best shown in FIG. 7 and is of generally T-shaped configuration in a vertical cross section including an enlarged upper curved portion 54 having a curvature conforming to that of the opening 52, and a restricted lower portion 55 defining shoulders 56 which are vertically spaced from the upper surface of the shelf 14. When the control unit 13 is inserted into the housing, the enlarged upper portion 54 of the guide bar enters the opening 52 of the saddle and the restricted portion 55 enters the slot 53 so that the shoulders 56 of the guide bar overlie parts of the saddle base 39. With such arrangement, substantial movement of the unit 13 relative to the housing is prevented in directions perpendicular to the path of guidance of the unit.

In order to effect proper alignment between the guide bar 50 and the plug-in openings 35 of the insulation member 32, the guide bar 50 has associated therewith a central aligning extension 57 (FIGS. 4 and 6) which projects rearwardly from the bar 50 into an aligning slot 58 formed in the forward insulation member 32 beneath and vertically aligned with the center one of the openings 35. It is understood that a plurality of vertically aligned slots 58 are formed in the busway each associated with a separate compartment. The extension 57 may comprise an integral part of the guide bar 50 and be formed of a metallic or an insulating material, or if desired, the extension 57 may constitute a separate part which is attached to the guide bar 50 in any suitable manner and to the saddle base by a screw 59. The extension 57 serves to accurately locate the guide bar 50 and the shelf 14 with respect to the busway 12 so that the control unit 13, when inserted, may be accurately guided into positive engagement with the bus bars. If the terminal blocks 18 are mounted by the shelves 14 rather than by the bracket 31, then the described aligning arrangement will also serve to accurately align the blocks 17 and 18 to assure positive engagement therebetween.

In order to facilitate insertion and withdrawal of the control unit into and out of a selected compartment, and to positively lock the control unit within the compartment, the present invention provides locking means preferably including the guide bar 50 engageable with an actuatable part on the control unit after partial insertion of the control unit. In the illustrated embodiment, the locking means includes an elongated threaded opening 60 formed centrally in the upper enlarged portion 54 of the guide bar 50 and extending from the front surface of the guide bar toward the rear thereof as best shown in FIGS. 4 and 7. The opening 60 is adapted to threadably receive the threaded end 61 of a screw 62 rotatably carried by a generally U-shaped bracket 63 mounted on the forward end of the base 39 of the saddle 37. As shown in FIGS. 4 and 8, the bracket 63 includes a flat base 64 resting on the saddle base 39 and a pair of upstanding spaced arms 65 and 66 with the arm 65 terminating in an angularly rearwardly projecting handle portion 67 which an operator may grasp to facilitate insertion of the control unit.

The screw 62 includes a slotted headed portion 68 and a shank 69 intermediate the head 68 and the threaded end 61, and the legs 65 and 66 include respectively aligned openings 70 and 71 through which the screw is extended into operative engagement with the bracket 63. As best shown in FIG. 8, when the screw 62 is operatively associated with the bracket 63, the head 68 bears against the forward surface of the leg 65 with the shank 69 intermediate the legs 65 and 66 and with the threaded end 61 spaced rearwardly of the rear surface of the leg 66. The screw 62 includes an annular groove 72 on the portion of the shank 69 between the threaded end 61 and the leg 66, and a snap-on split ring 73 is positioned within the groove 72 after the screw 62 is mounted on the bracket 63. Prior to positioning of the ring 73 within the groove 72 a cup-shaped collar 74 is positioned to surround the shank 69 so that the opening 75 thereof faces the groove 72 as clearly shown in FIG. 8. The opening 75 is of sufficient diameter to receive the ring 73 for a purpose presently to appear.

In order to position the control unit within a selected compartment an operator grasps the handle 67 of the bracket 63 and lifts the control unit onto the shelf 14 with the opening 52 in alignment with the guide bar 50. The control unit is then moved into the housing manually such that the guide bar is received within the opening 52 and the slot 53 until the tip of the threaded end 61 of the screw 62 engages the threaded opening 60. In order to complete insertion of the control unit it is now necessary for the operator to effect rotation of the screw 62 into the threaded opening 60 which results in movement of the control unit with respect to the guide bar 50 into the housing. When the unit has been so moved to an extent such that the stab contacts 36 have entered the openings 35 of the insulation member 32 and the openings 34 of the bus bars 33, rotation of the screw may be terminated. The control unit 13 is now rigidly locked in operative position within the compartmenet and can be removed therefrom only by rotation of the screw 62 in the reverse direction.

When the screw 62 is rotated in the reverse direction to effect withdrawal of the control unit from the compartment, the screw 62 is initially moved longitudinally with respect to the bracket 63 and the portion 61 is partially withdrawn from the opening 60 until the split ring 73 enters the opening 75 of the collar 74 to bear against the base of the opening 75 and compress the collar 74 against the adjacent surface of the leg 66. Continued rotation of the screw 62 in the reverse direction effects movement of the control unit outwardly of the housing with a strong uniform force effective to gradually disengage the stab contacts from the bus bars. When the screw is completely disengaged from the guide bar 50, the control unit may be completely removed from the housing. It is noted that the ring 73 also serves to hold the screw 62 captive on the bracket 63, and is confined against expansion out of the groove 72 by the collar 74 during withdrawal pressures. It is appreciated that the speed of insertion and withdrawal of the unit 13 may be varied as desired by suitable selection of the configuration of the threads of the parts 60 and 61.

In FIG. 4 an arrangement is shown wherein the lengths of the threaded end 61 of the screw and the threaded opening 60 are selected such that when the control unit 13 is inserted, the stab contacts 36 are engaged with the bus bars 33 at the time that the threaded end 61 initially engages the opening 60. With this arrangement it is impossible for the contacts 36 to become misaligned relative to the bus bars during rotation of the screw 62 in the inserting direction.

FIG. 5 illustrates a different arrangement from that shown in FIG. 4 in that the stab contacts 36 are spaced forwardly of the insulation openings 35 at the time that the tip of the threaded end 61 engages the threaded opening 60. Such arrangement is achieved by forming the threaded end 61 and the threaded opening 60 with greater length dimensions than those illustrated in FIG. 4. With the arrangement of FIG. 5 a power connection is impossible when the tip of the threaded portion 61 first engages the opening 60, and the operator may perform operations on the control unit with the knowledge that an accidental power connection is impossible until such time as the screw 62 is rotated in the inserting direction.

The present invention also contemplates the provision of auxiliary means for securely locking the unit 13 within the housing in a position wherein the contacts 36 are disengaged from the bus bars. To this end the saddle 37 and the shelf 14 are provided with openings 80 and 81 respectively (FIG. 6) which are positioned equal distances laterally from the center lines of the slot 53 and of the bar 50 so as to be in vertical alignment when the unit 13 is on the shelf 14 with the contacts 36 spaced forwardly of the busway. The openings 80 and 81 and an opening 82 in the side wall 44 are proportioned to receive a lock device, such as a conventional padlock (not shown). With such arrangement the unit 13 may be locked within the housing in a "power off" position wherein an operator may safely perform operations thereon. Also, the openings 80 and 81 are readily aligned by an operator since they are dimensionally tied to the guide means which interfit when the unit 13 is moved to align the openings.

The control center of the present invention possesses advantages and features not found in prior art constructions. The guide means comprised of a bar 50 in the compartment and the opening and slot 52 and 53 on the control unit permit very accurate guidance of the control unit relative to the bus bars during insertion of the control unit. By means of the extension 57 fitting within the slot 58 of the busway insulation, the guide bar 50 and shelf 14 are accurately aligned with respect to the bus bars to ensure positive engagement of the stab contacts on the control unit with the bus bars during insertion of the control unit. The configuration of the guide bar 50 is such that substantial movements of the control unit in directions perpendicular to the path of insertion thereof relative to the housing is prevented. The locking means comprised of the threaded opening 60 in the guide bar and the screw 62 on the control unit facilitates insertion and withdrawal of the control unit relative to the housing in a manner minimizing the possibility of injury to operating personnel and damage to the control unit. Furthermore the locking means permits withdrawal of the control unit in a smooth and gradual manner thus eliminating quick and sudden movements of the control unit heretofore resulting from excessive pulling forces required by manual withdrawal thereof. In addition, the locking means provides a very simple and inexpensive means of retaining the control unit rigidly in position within the housing.

While the invention has been described in connection with certain embodiments thereof, it should be understood that this has been clearly illustrative in nature and has been set forth as a preferred form of the invention. Since certain variations in the invention will doubtless occur to those skilled in the art to which the invention pertains, I intend to cover by the appended claims all such variations as fall within the true spirit and scope of this invention.

What I claim as new and desire to secure by Letters Patent of the United States is:

1. An electrical structure comprising, a housing having a front opening, a busway including a plurality of bus bars in the housing, each bus bar having a plug-in opening, a unit to be inserted and withdrawn through the front opening into and out of the housing and including stab contacts for plug-in connection to and disconnection from the plug-in openings of said bus bars, said busway having an aligning slot, support means in the housing for mounting said unit when inserted, guide means on said unit and in said housing for cooperation when the unit is inserted to guide the unit into connected relation with said bus bars, said guide means including an elongated guide bar mounted on said support means and a guide slot formed in said unit to receive the guide bar, said guide bar and guide slot being arranged to prevent substantial movement of the unit relative to the support means in all directions perpendicular to the path of guidance during insertion and withdrawal of the unit, and means on the guide bar extending through said aligning slot in the busway for aligning the guide bar relative to said bus bars to assure positive connection of said unit to said bus bars when the unit is inserted.

2. An electrical structure comprising, a housing having a front opening, a plurality of bus bars in the housing, a unit to be inserted and withdrawn through the front opening into and out of the housing for plug-in connection to and disconnection from said bus bars, support means in the housing for mounting said unit when inserted, guide means on said unit and in said housing for cooperation when the unit is inserted to guide the unit into connected relation with said bus bars, and actuatable means on said unit engageable with the guide means in said housing when the unit is inserted, said actuatable means when engaged with the guide means in the housing locking said unit within said housing and being effective in response to actuation thereof in one direction to move the unit into positive connection with the bus bars, and being effective in response to actuation thereof in another direction to move the unit out of connection with the bus bars.

3. A structure as defined in claim 2 wherein said actuatable means comprises a screw rotatably mounted on the unit to threadably engage a threaded opening in the guide means in the housing.

4. An electrical structure comprising, a housing having a front opening, a busway including a plurality of bus bars in the housing, each bus bar having a plug-in opening, said busway having an aligning slot a unit to be inserted and withdrawn through the front opening into and out of the housing and including stab contacts for plug-in connection to and disconnection from the plug-in opening of said bus bars, support means in the housing for mounting said unit when inserted, guide means on said unit and in said housing for cooperation when the unit is inserted to guide the unit into connected relation with said bus bars, said guide means being arranged to prevent substantial movement of the unit relative to the support means in all directions perpendicular to the path of guidance during insertion and withdrawal of the unit, means on said guide means in the housing extending through the aligning slot in the busway for aligning the guide means in the housing relative to said bus bars to assure positive connection of said unit to said bus bars when the unit is inserted, and actuatable means on said unit engageable with the guide means in said housing when the unit is inserted, said actuatable means when engaged with the guide means in the housing locking said unit within said housing and being effective in response to actuation thereof in one direction to move the unit into positive connection with the bus bars, and being effective in response to actuation thereof in another direction to move the unit out of connection with the bus bars.

5. An electrical structure comprising, a housing having a front opening, a busway in the housing including a plurality of bus bars, and insulation for the bus bars at the side thereof facing said front opening, said insulation having plug-in openings, a unit including stab contacts to be inserted and withdrawn through the front opening into and out of the housing to move the stab contacts into and out of engagement with said bus bars, support means in the housing for mounting said unit when inserted, and guide means on said unit and in said housing for cooperation when the unit is inserted to guide the stab contacts through the plug-in openings into engagement with said bus bars, the guide means in said housing having a threaded opening, and a screw rotatably mounted on said unit for threaded engagement with said threaded opening when the unit is inserted and effective when rotated to move the unit toward and away from said busway.

6. A structure as defined in claim 5 wherein said stab contacts are within said plug-in openings when said screw initially engages said threaded opening during insertion of said unit.

7. A structure as defined in claim 5 wherein said stab contacts are spaced forwardly of said plug-in openings when said screw initially engages said threaded opening during insertion of said unit.

8. An electrical structure comprising, a housing having a front opening, a vertically extending busway in the housing including a plurality of bus bars, and insulation for the bus bars at the side thereof facing said front opening, said insulation having plug-in openings and an aligning slot vertically aligned with one of the plug-in openings, a unit including plug-in contacts to be inserted and withdrawn through the front opening into and out of the housing to move the plug-in contacts through said plug-in openings into and out of engagement with said bus bars, support means in the housing for mounting said unit when inserted, guide means on said unit and in said housing for cooperation when the unit is inserted to guide the plug-in contacts through the plug-in openings into engagement with said bus bars, the guide means in said housing having a part which projects into said aligning slot to align the guide means in the housing relative to the bus bars, and actuatable means on said unit engageable with the guide means in said housing when the unit is inserted, said actuatable means when engaged with the guide means in the housing locking said unit within said housing and being effective in response to actuation thereof in one direction to move the plug-in contacts into positive engagement with the bus bars, and being effective in response to actuation thereof in another direction to move the plug-in contacts out of engagement with the bus bars.

9. A structure as defined in claim 8 wherein said actuatable means comprises a screw rotatably mounted on the unit to threadably engage a threaded opening in the guide means in the housing.

10. An electrical structure comprising, a housing having a front opening, a plurality of vertically extending bus bars in the housing, a unit to be inserted and withdrawn through the front opening into and out of the housing for plug-in connection to and disconnection from the bus bars, a horizontal shelf in the housing for mounting the unit when inserted, an elongated guide bar detachably mounted on said shelf in predetermined fixed position relative to the bus bars and extending from adjacent said front opening toward the bus bars, said unit including a mounting saddle having a rear wall and a base connected to the wall to slidably engage said shelf when the unit is inserted, an electrical device mounted on the saddle, a contact block mounted on the saddle wall having stab contacts connected to said electrical device to engage said bus bars, said saddle having a guide slot adapted for interfitting engagement with said guide bar when the unit is inserted to guide said contacts into engagement with said bus bars, said guide bar having a threaded opening extending longitudinally thereof, and a screw rotatably mounted on the saddle for threaded engagement with said threaded opening when the unit is inserted to effect movement of said unit toward and away from said bus bars.

11. An electrical structure comprising, a housing having a front opening, a plurality of vertically extending bus bars in the housing, a unit to be inserted and withdrawn through the front opening into and out of the housing for plug-in connection to and disconnection from the bus bars, a horizontal shelf in the housing for mounting the unit when inserted, an elongated guide bar detachably mounted on said shelf in predetermined fixed position relative to the bus bars and extending from adjacent said front opening toward the bus bars, said unit including a mounting saddle having a rear wall and a base connected to the wall to slidably engage said shelf when the unit is inserted, an electrical device mounted on the saddle, a contact block mounted on the saddle wall having contacts connected to said electrical device to engage said bus bars, said saddle having a guide slot adapted for interfittting engagement with said guide bar when the unit is inserted to guide said contacts into engagement with said bus bars, a bracket on the base of said saddle having a pair of parallel arms with aligned openings therein, a screw having a threaded end extending through the openings, a head bearing against one of said arms, and a shank between the head and threaded end having an annular groove adjacent the threaded end, a split ring in said groove, and a collar on said shank between the ring and the other of said arms, said guide bar having a threaded opening aligned with said screw when said guide bar is in said guide slot, said screw when engaged with said threaded opening being effective when rotated into said threaded opening to effect insertion of the unit and engagement of said contacts with said bus bars, said ring being engageable with said collar to press the collar against the other of said arms to effect withdrawal of the unit and disengagement of said contacts from said bus bar in response to rotation of the screw out of said threaded opening.

12. An electrical structure comprising, a housing having a front opening, a plurality of bus bars in the housing, a unit to be inserted and withdrawn through the front opening into and out of the housing for plug-in connection to and disconnection from said bus bars, support means in the housing for mounting said unit when inserted, guide means on said unit and in said housing for cooperation when the unit is inserted to guide the unit into connected relation with said bus bars, a bracket on said unit having a pair of parallel arms with aligned openings therein, a screw having a threaded end extending through the openings, a head bearing against one of said arms, and a shank between the head and threaded end having an annular groove adjacent to the threaded end, a split ring in said groove and a collar on said shank between the ring and the other of said arms, said guide means in the housing having a threaded opening aligned with said screw when said guide means in the housing is in cooperation with the guide means on said unit, said screw when engaged with said threaded opening being effective when rotated into said threaded opening to effect insertion of the unit and engagement of said contacts with said bus bars, said ring being engageable with said collar to press the collar against the other of said arms to effect withdrawal of the unit and disengagement of said contacts from said bus bar in response to rotation of the screw out of said threaded opening.

13. An electrical structure comprising, a housing having a front opening, a vertically extending busway in the housing including a plurality of vertical bus bars and insulation for the bus bars at the side thereof facing said front opening, said insulation having plug-in openings and an aligning slot vertically aligned with one of the plug-in openings, a unit to be inserted and withdrawn through the front opening into and out of the housing for plug-in connection to and disconnection from the bus bars, a horizontal shelf in the housing for mounting the unit when inserted, an elongated guide bar detachably mounted on said shelf extending from adjacent said front opening toward the bus bars, said unit including a mounting saddle having a rear wall and a base connected to the wall to slidably engage said shelf when the unit is inserted, an electrical device mounted on the saddle, a contact block mounted on the saddle wall having contacts connected to said electrical device for plug-in engagement with said bus bars, said saddle having a guide slot adapted for interfitting engagement with said guide bar when the unit is inserted to guide said contacts through said plug-in openings into plug-in engagement with said bus bars, said guide bar having a part which projects into said aligning slot to align the guide bar relative to the bus bars, said guide bar having a threaded opening extending longitudinally thereof, and a screw rotatably mounted on the saddle for threaded engagement with said threaded opening when the unit is inserted to effect movement of said unit toward and away from said bus bars.

14. An electrical structure comprising, a housing having a front opening, a vertically extending busway in the housing including a plurality of vertically extending bus bars and insulation for the bus bars at the side thereof facing said front opening, said insulation having plug-in openings, a unit to be inserted and withdrawn through the front opening into and out of the housing for plug-in connection to and disconnection from the bus bars, a horizontal shelf in the housing for mounting the unit when inserted, an elongated guide bar mounted on the shelf in predetermined fixed position relative to the bus bars and extending from adjacent said front opening toward the bus bars generally parallel to the path of insertion and withdrawal of said unit, said guide bar including a restricted lower neck portion and an enlarged upper portion having lateral shoulders vertically spaced from said shelf, said unit including a mounting saddle having a rear wall and a base connected to the wall to slidably engage said shelf when the unit is inserted, an electrical device mounted on the saddle, and a contact block mounted on the saddle wall having contacts connected to said electrical device for plug-in engagement with said bus bars, said saddle wall having an aperture and said saddle base having a slot communicating with said aperture, said aperture and slot being adapted to receive respectively the enlarged upper portion of the guide bar and the restricted neck portion thereof when the unit is inserted to guide the contacts through the plug-in openings into plug-in engagement with the bus bars, said guide bar and said aperture and slot preventing substantial movement of the unit relative to the shelf in all directions perpendicular to the path of insertion and withdrawal of the unit during such insertion and withdrawal.

15. An electrical structure comprising, a housing having a front opening, a plurality of vertically extending bus bars in the housing, a unit to be inserted and withdrawn through the front opening into and out of the housing for plug-in connection to and disconnection from the bus bars, a horizontal shelf in the housing for mounting the unit when inserted, an elongated guide bar on said shelf in predetermined fixed position relative to the bus bars and extending from adjacent said front opening toward the bus bars, said guide bar including a restricted lower neck portion and an enlarged upper portion having shoulders vertically spaced from said shelf, said unit including a mounting saddle having a rear wall and a base connected to the rear wall to slidably engage said shelf when the unit is inserted, an electrical device mounted on the saddle, a contact block mounted on the saddle wall having stab contacts connected to said electrical device to engage said bus bars, said unit including guide means adapted for interfitting engagement with said guide bar when the unit is inserted to guide said stab contacts into engagement with said bus bars, said guide means including an aperture in said wall configured for receiving the enlarged upper portion of said guide bar, and a guide slot in said base communicating with said aperture for receiving said restricted neck portion, the enlarged upper portion of said guide bar having a threaded opening extending longitudinally thereof, and a screw rotatably mounted on the saddle for threaded engagement with said threaded opening when the unit is inserted to effect movement of said unit toward and away from said bus bars.

16. An electrical structure comprising, a housing having a front opening, a vertically extending busway in the housing including a plurality of vertical bus bars each having a plug-in opening to receive a stab contact, and insulation for the bus bars at the side thereof facing said front opening, said insulation having plug-in openings horizontally aligned with the plug-in openings of said bus bars, a unit to be inserted and withdrawn through the front opening into and out of the housing for plug-in connection to and disconnection from the bus bars, a horizontal shelf in the housing for mounting the unit when inserted, an elongated guide bar detachably secured to the upper surface of the shelf extending from adjacent said front opening toward said insulation, said guide bar having a restricted lower neck portion and an enlarged upper portion having lateral shoulders spaced vertically from said shelf, said unit including a mounting saddle having a rear wall and a base connected to the wall to slidably engage said shelf when the unit is inserted, an electrical device mounted on the saddle, and a contact block mounted on the saddle wall having stab contacts connected to said electrical apparatus to be inserted through the plug-in openings of said insulation into the plug-in openings of said bus bars to engage inner walls of said bus bars, said saddle including means cooperating with said guide bar during insertion of the unit to guide said contacts into said plug-in openings, said last-named means including an aperture in the wall of said saddle for receiving the enlarged upper portion of said guide bar, and a guide slot in the base of said saddle communicating with said aperture in the saddle wall for receiving said restricted neck portion, said insulation having an aligning slot in vertical alignment with one of the plug-in openings, and a rear extension on said guide bar fitting within said aligning slot.

17. An electrical structure comprising, a housing having a front opening, a vertically extending busway in the housing including a plurality of vertical bus bars each having a plug-in opening to receive a stab contact, and insulation for the bus bars at the side thereof facing said front opening, said insulation having plug-in openings horizontally aligned with the plug-in openings of said bus bars, a unit to be inserted and withdrawn through the front opening into and out of the housing for plug-in connection to and disconnection from the bus bars, a horizontal shelf in the housing for mounting the unit when inserted, an elongated guide bar detachably secured to the upper surface of the shelf extending from adjacent said front opening toward said insulation, said guide bar having a restricted lower neck portion and an enlarged upper portion having lateral shoulders spaced vertically above said shelf, said unit including a mounting saddle having a rear wall and a base connected to the wall to slidably engage said shelf when the unit is inserted, an electrical device mounted on the saddle, a contact block mounted on the saddle wall having stab contacts connected to said electrical device to be inserted through the plug-in openings of said insulation into the plug-in openings of said bus bars to engage inner walls of said bus bars, said saddle including means cooperating with said guide bar during insertion of the unit to guide said contacts into said plug-in openings, said last-named means including an aperture in the wall of said saddle for receiving the enlarged upper portion of said guide bar, and a guide slot in the base of said saddle communicating with said aperture in the saddle wall for receiving said restricted neck portion, the enlarged upper portion of said guide bar having a threaded opening extending longitudinally thereof, and a screw rotatably mounted on the saddle for threaded engagement with said threaded opening when the unit is inserted and effective when rotated to move said unit toward and away from said bus bars, said insulation having an aligning slot in vertical alignment with one of the plug-in openings thereof, and a rear extension on said guide bar fitting within said aligning slot.

18. An electrical structure comprising, a housing having a front opening, a vertically extending busway in the housing including a plurality of vertical bus bars each having a plug-in opening to receive a stab contact, and insulation for the bus bars at the side thereof facing said front opening, said insulation having plug-in openings horizontally aligned with the plug-in openings of said bus bars, a unit to be inserted and withdrawn through the front opening into and out of the housing for plug-in connection to and disconnection from the bus bars, a horizontal shelf in the housing for mounting the unit when inserted, an elongated guide bar detachably secured to the upper surface of the shelf extending from adjacent said front opening toward said insulation, said guide bar having a restricted lower neck portion and an enlarged upper portion having lateral shoulders spaced vertically above said shelf, said unit including a mounting saddle having a rear wall and a base connected to the wall to slidably engage said shelf when the unit is inserted, an electrical device mounted on the saddle, a contact block mounted on the saddle wall having stab contacts connected to said electrical device to be inserted through the plug-in openings of said insulation into the plug-in openings of said bus bars to engage inner walls of said bus bars, said saddle including means cooperating with said guide bar during insertion of the unit to guide said contacts into said plug-in openings, said last-named means including an aperture in the wall of said saddle for receiving the enlarged upper portion of said guide bar, and a guide slot in the base of said saddle communicating with said aperture in the saddle wall for receiving said restricted neck portion, the enlarged upper portion of said guide bar having a threaded opening extending longitudinally thereof, a bracket on the base of said saddle having a pair of parallel upstanding arms one of which terminates in a rearwardly projecting handle portion, and a screw rotatably mounted by said arms for threaded engagement with said threaded opening when the unit is inserted and effective when rotated to move said unit toward and away from said bus bars, said insulation having an aligning slot in vertical alignment with one of the plug-in openings thereof, and a rear extension on said guide bar fitting within said aligning slot.

19. An electrical structure comprising, a housing having a front opening, a vertically extending busway in the housing including a plurality of vertical bus bars each having a plug-in opening to receive a stab contact, and insulation for the bus bars at the side thereof facing said front opening, said insulation having plug-in openings horizontally aligned with the plug-in openings of said bus bars, a unit to be inserted and withdrawn through the front opening into and out of the housing for plug-in connection to and disconnection from the bus bars, a horizontal shelf in the housing for mounting the unit when inserted, an elongated guide bar detachably secured to the upper surface of the shelf extending from adjacent said front opening toward said insulation, said guide bar having a restricted lower neck portion and an enlarged upper portion having lateral shoulders spaced vertically above said shelf, said unit including a mounting saddle having a rear wall and a base connected to the wall to slidably engage said shelf when the unit is inserted, an electrical device mounted on the saddle, a contact block mounted on the saddle wall having stab contacts connected to said electrical device to be inserted through the plug-in openings of said insulation into the plug-in openings of said bus bars to engage inner walls of said bus bars, said saddle including means cooperating with said guide bar during insertion of the unit to guide said contacts into said plug-in openings, said last-named means including an aperture in the wall of said saddle for receiving the enlarged upper portion of said guide bar, and a guide slot in the base of said saddle communicating with said aperture in the saddle wall for receiving said restricted neck portion, the enlarged upper portion of said guide bar having a threaded opening extending longitudinally thereof, a screw rotatably mounted on the saddle and having a threaded end for threaded engagement with said threaded opening when the unit is inserted and effective when rotated to move said unit toward and away from said bus bars, said insulation having an aligning slot in vertical alignment with one of the plug-in openings thereof, a rear extension on said guide bar fitting within said aligning slots, a bracket on the base of said saddle for mounting said screw and having a pair of parallel upstanding arms with aligned openings through which said screw extends, said screw having a head bearing against one of said arms, and a shank between the head and threaded end, having an annular groove adjacent the threaded end, and a split ring in said groove and a collar on said shank between the ring and the other of said arms.

References Cited in the file of this patent
UNITED STATES PATENTS

| | | |
|---|---|---|
| 1,170,990 | Platt | Feb. 8, 1916 |
| 2,530,945 | Chapmon | Nov. 21, 1950 |
| 2,579,141 | Eckert et al. | Dec. 18, 1951 |
| 2,802,997 | Bronckhurst et al. | Aug. 13, 1957 |
| 3,011,098 | Godley | Nov. 28, 1961 |
| 3,066,244 | Defandorf et al. | Nov. 27, 1962 |